Nov. 22, 1932.　　　A. SHUMAN　　　1,888,965
MANUFACTURE OF CORRUGATED WIRE GLASS
Filed June 8, 1931　　2 Sheets-Sheet 1

WITNESS:

INVENTOR
Arno Shuman
BY Augustus B. Stoughton
ATTORNEY.

Patented Nov. 22, 1932

1,888,965

UNITED STATES PATENT OFFICE

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY

MANUFACTURE OF CORRUGATED WIRE GLASS

Application filed June 8, 1931. Serial No. 542,763.

The principal objects of the present invention are, first, to provide for making corrugated wire glass free from surface checks or cracks and in which the wire is properly centered in the sheet; second, to provide for bending or forming a flat sheet of wire glass into corrugated form without, in some cases, additional heat than is present in the glass after the flat rolling operations; and third, to minimize loss of heat in the corrugating process.

Other objects of the invention will appear from the following description at the end of which the invention will be claimed.

Generally stated, the invention consists of apparatus for making corrugated wire glass comprising mechanism for rolling flat sheets of wire glass, and forming or bending mechanism into which the hot flat sheets of glass are drawn and which includes two sets of relatively movable table bars arranged side by side in lateral contact with each other and adapted to be positioned in flush relation and to be positioned one set above the other, and platen bars confronting the spaces between the set of table bars which are positioned in raised position.

The invention also consists in the method of corrugating a hot sheet of flat wire glass which includes supporting it at spaced intervals, and forming and bending it between the supports.

The invention also comprises the improvements to be presently described and finally claimed.

In the following description reference will be made to the accompanying drawings forming part hereof and in which Figure 1 is a view, partly in section and partly in elevation and of somewhat diagrammatic character, illustrating apparatus embodying features of the invention and adapted for use in the practice of the method of the invention.

Figure 1:
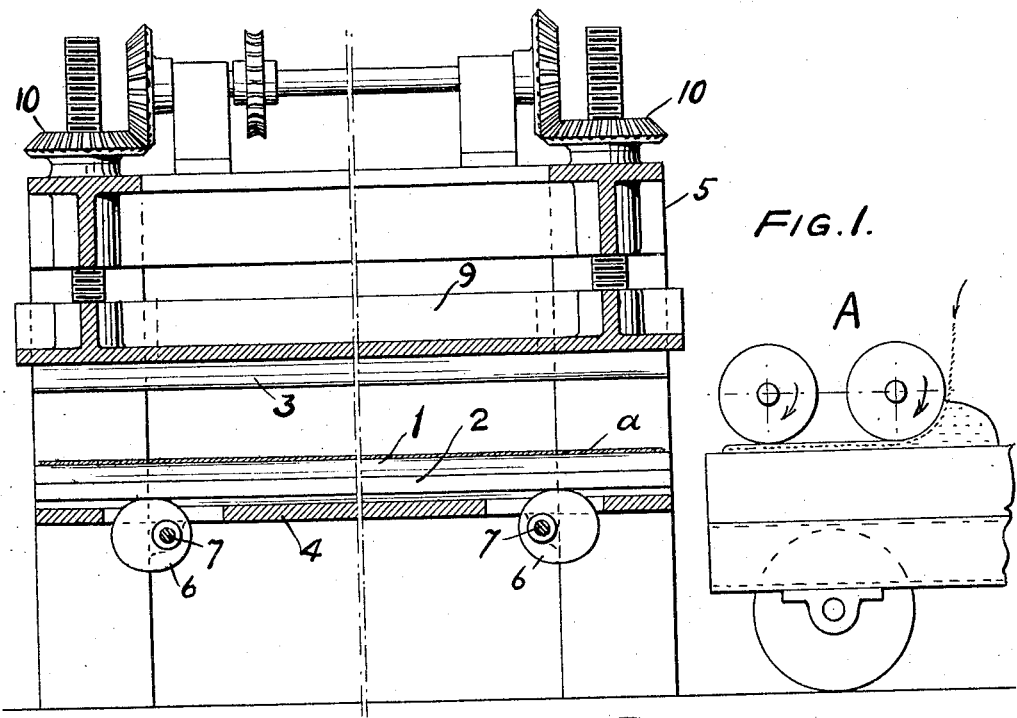
Figure 2:
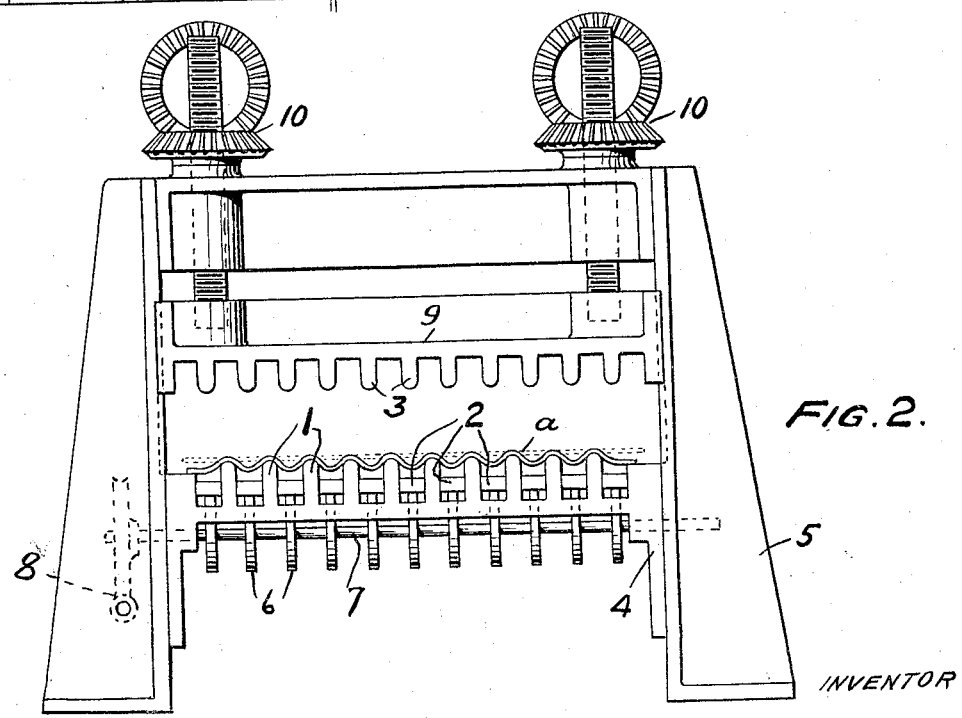
Fig. 2 is an end view of the apparatus shown at the left in Fig. 1 and illustrative of the method of the invention.
Figure 3:
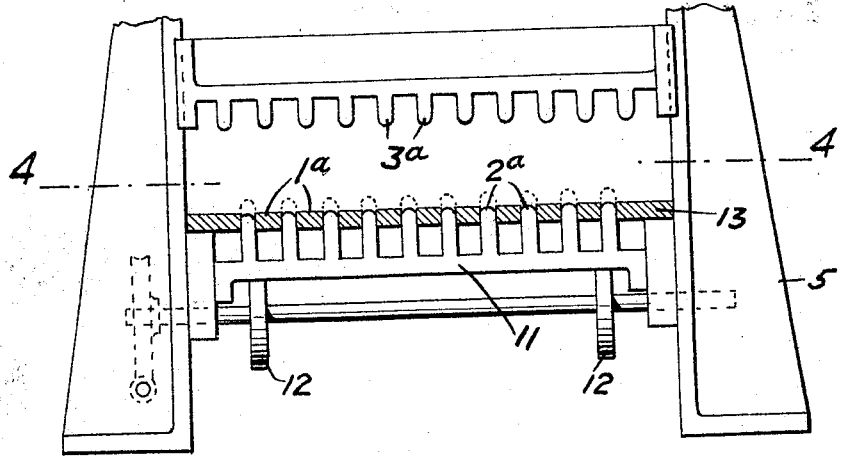
Fig. 3 is an end view partly in section, of apparatus embodying a modification.

Referring to the drawings there are two sets of relatively movable table bars or rails 1 and 2 of which the bars 1 are shown as provided with rounded surfaces. There are means for positioning the surfaces of these bars 1 and 2 in flush relation, as indicated in Fig. 3, to provide a flat table onto which a hot flat sheet of wire glass is drawn. 3 indicates platen bars arranged opposite one set of table bars 2, Fig. 2, and they are shown as provided with rounded surfaces. There are means for lowering the platen bars 3, and there are means for dropping the set of table bars 2, Fig. 2, which confront the platen bars as the latter push portions of the sheet downward. Referring to Figs. 1 and 2, the table bars 1 are connected to a structure 4 rigid with the frame of the machine 5. The movable table bars 2 are raised and lowered by cams 6 mounted on a shaft 7 and driven by gearing 8. The platen bars 3 project from a head 9 slidable in ways in the frame 5 and raised and lowered by gearing 10. It will be understood that the various bars and rails 1, 2 and 3 extend lengthwise of the machine and are long enough to accommodate the wire glass sheet which they corrugate. At A, Fig. 1, is shown diagrammatically apparatus for rolling a flat sheet of wire glass $a$. With the table bars arranged in flush relation, a flat sheet of wire glass $a$, while hot as from rolling, is drawn onto the comparatively flat support provided by the bars 1 and 2 in flush relation, then the head 9 descends and the bars 2 descend so that the flat sheet of wire glass $a$, indicated by dotted lines in Fig. 2, is supported at intervals on the bars 1, and the bars 2 descending, clear of the sheet of glass, permit the platen bars to contact with the sheet of glass between the intervals at which it is supported on the bars 1 and to form or bend the hot sheet of wire glass into corrugated form.

Figure 4:
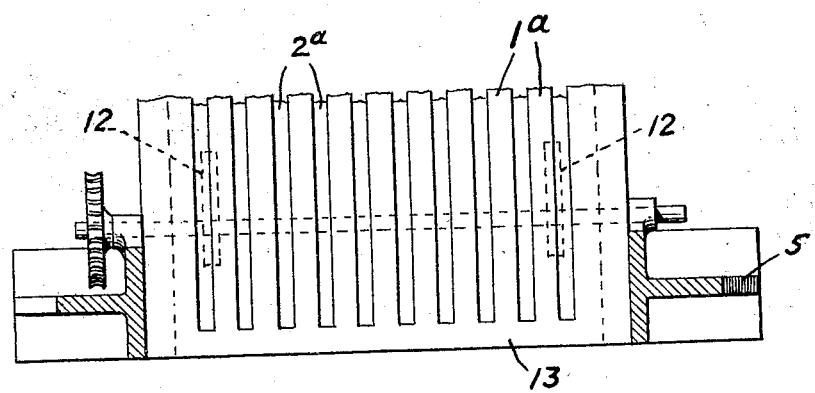
Fig. 4 is a sectional top or plan view taken on the line 4—4 of Fig. 3 with parts broken away, of the apparatus shown in Fig. 3.

The construction and mode of operation of the modification shown in Figs. 3 and 4 are as above described except that the movable table bars 2ª are connected to and project above the yoke 11 which is operated by a pair of cams 12 at each end of the machine. The movable bars 2ᵃ in this case are raised, lifting up the flat sheet of wire glass and the platen bars 3ᵃ form or bend it. The fixed bars 1ᵃ are provided by slotting the table 13 fast to the frame 5 of the machine.

It will be obvious to those skilled in the art to which my invention relates that modifications may be made in details of construction and arrangement and matters of mere form without departing from the spirit of the invention which is not limited to such matters or otherwise than the prior art and the appended claims may require.

I claim:

1. The method of corrugating a hot sheet of previously made flat wire glass which includes suspending portions of the hot sheet in the air by supporting it at intervals, and bending and forming the suspended portions of the sheet while still suspended in the air without trapping it.

2. The method of corrugating a hot sheet of previously made flat wire glass which includes suspending portions of the hot sheet in the air by supporting it at intervals upon rounded parallel spaced surfaces, and forming or bending the suspended portions of the sheet while still suspended in the air without trapping it by the application to them of spaced parallel rounded surfaces.

3. Apparatus for corrugating a hot sheet of flat wire glass comprising two sets of relatively movable parallel table bars arranged in lateral contact with each other, means for positioning the surfaces of the bars in flush relation to provide a flat table onto which the hot flat sheet of wire glass can be drawn, platen bars arranged opposite one set of table bars, means for raising and lowering the platen bars, and means for dropping the set of table bars which confront the platen bars as the platen bars push portions of the sheet downward.

4. Corrugating apparatus into which a hot flat wire glass sheet is drawn and which includes two sets of relatively movable table bars arranged side by side in lateral contact with each other, means for positioning said bars in flush relation and in position with one set of bars above the other, platen bars confronting the spaces between the movable set of table bars, and means for raising and lowering the platen bars.

5. In apparatus for corrugating flat sheets of hot wire glass the combination of two sets of table bars arranged side by side in lateral proximity with each other and of which one set is movable vertically in respect to the other set, one set of said bars having rounded faces, platen bars having rounded faces and confronting the spaces between the movable set of table bars, and means for actuating said parts.

ARNO SHUMAN.